United States Patent [19]

Lineberry et al.

[11] 4,173,910
[45] Nov. 13, 1979

[54] METHOD AND APPARATUS FOR HANDLING BRICK

[76] Inventors: Cletus E. Lineberry, Rte. 1, Box 106, Staley, N.C. 27355; John G. Buckner, Rte. 2, Box 83, Ramseur, N.C. 27315; Jimmy W. Harris, 618 Circle Dr., Siler City, N.C. 27344

[21] Appl. No.: 910,646

[22] Filed: May 30, 1978

Related U.S. Application Data

[63] Continuation-in-part of Ser. No. 854,150, Nov. 23, 1977, abandoned.

[51] Int. Cl.² .................... B26D 7/06; B28B 11/14
[52] U.S. Cl. ................................... 83/29; 83/87; 83/90; 83/419; 83/425.2; 83/651.1; 414/95
[58] Field of Search ............ 83/29, 87, 90, 419, 83/425.2, 651.1, 91, 96; 214/6 A, 6 BA, 6 F

[56] References Cited

U.S. PATENT DOCUMENTS

| | | | |
|---|---|---|---|
| 2,917,991 | 12/1959 | Segur | 214/6 A X |
| 2,924,051 | 2/1960 | More | 214/6 BA X |
| 3,220,570 | 11/1965 | Swanson et al. | 214/6 BA |
| 3,478,896 | 11/1969 | Pearne | 214/6 A |
| 3,602,963 | 9/1971 | Lingl | 83/91 |

*Primary Examiner*—Frank T. Yost
*Attorney, Agent, or Firm*—Mills & Coats

[57] ABSTRACT

The present invention relates to a method and apparatus for hacking brick specifically involving the stacking of uncured or green brick into a two course high brick stack prior to the bricks being transferred and stacked onto a kiln car for curing and drying. As a part of the method and apparatus of the present invention, slugs of brick material are received and successively pushed by a first pusher through a wire type brick cutter onto a receiving table, each slug resulting in a series of aligned bricks disposed in side-by-side relationship and referred to as a brick row. A vertically movable elevator assembly is mounted adjacent the supply table and includes at least two vertically spaced receiving levels formed therein with each receiving level being adapted to receive and support a row of bricks. As the elevator assembly is actuated up and down, individual brick rows are pushed into each of the respective receiving levels of the elevator assembly. A second pusher is cooperable with said first pusher to effectively simultaneously discharge both rows of bricks from said elevator assembly onto an adjacent receiving table with the uppermost row of brick falling onto and being supported by the lowermost row of brick to form a two course high brick stack. Successive discharges from the elevator assembly result in a multi-row or column two course high brick stack being formed on the receiving table such that after a predetermined size stack of brick have been formed on the receiving table such may be transferred by a conventional setter from the receiving table onto a kiln car.

25 Claims, 12 Drawing Figures

METHOD AND APPARATUS FOR HANDLING BRICK

The present application is a continuation-in-part of U.S. patent application Ser. No. 854,150, filed Nov. 23, 1977, now abandoned, and relates to a method and apparatus for stacking bricks, and more particularly involves a method and apparatus for forming at least a two course high stack of bricks during a brick hacking operation.

BACKGROUND OF THE INVENTION

In the manufacture of bricks, a clay type soil composition and certain other additives are mixed together in an extrusion mill to produce a continuous uncured brick extrusion. Typically, in one conventional type of brick producing operation, the continuous extrusion of brick material is cut into slugs and each slug is then pushed through a cutter assembly to produce a row of cut bricks. Successive rows of cut brick are then pushed together to form a group of bricks and by the employment of a conventional gripper assembly, the group of bricks, is transferred and stacked onto a kiln car and then directed through a curing and drying chamber.

Capacity and efficiency is of a principal concern in brick manufacturing plants. To increase efficiency and the number of bricks produced per hour, it is known to double stack the individual cut slugs prior to cutting the same in order to produce a two course high row of bricks from each pair of slugs pushed through the cutter assembly. Also, it is known to stack a group of cut brick on top of a like group of cut brick subsequent to the cutting operation to form a two course high stack of brick prior to the transfer of the stack or group of bricks in the kiln car. It is thusly appreciated by forming two course high brick stacks prior to setting or transferring the formed stack to the kiln car, that the cycling of the setter or gripper assembly is reduced for a given number of bricks. Generally this gives rise to increased capacity and brick producing efficiency.

However, many of the conventional slug stackers and stackers for stacking cut brick rows during the brick hacking operation have been complicated, difficult to maintain, and generally been less than satisfactory. For example, many devices used to stack one course of cut brick on top of another like course of brick is referred to as an inverter because such is provided with the capability to invert a particular course of brick being stacked in order to appropriately orient the face of the bricks to gain a desired appearance during the curing and drying operation. This inversion is time consuming and obviously the mechanical provision therefor complicates the stacking apparatus and the controls therefor.

In addition, where texturizing of the bricks is to be performed, it is desirable to perform the texturizing about the face of the bricks after cutting, but prior to the bricks being stacked on the kiln car for curing and drying. Where one course is disposed atop another course, it obviously follows that the brick faces of courses stacked underneath another course are not exposed and consequently cannot be directly texturized after stacking. Thus, with conventional slugs and brick row stackers, texturizing is difficult and in some cases impossible where the total apparatus does not make provisions for texturizing prior to single courses being stacked atop another course.

SUMMARY OF THE INVENTION

The present invention presents a method and apparatus for handling and stacking brick with the apparatus including a two course high stacking elevator assembly adapted to cycle vertically between two receiving positions. In each receiving position, the elevator assembly is adapted to receive a row of cut bricks such that during each cycle the elevator assembly when filled includes two rows of bricks, one row disposed over the other in spaced apart relationship. Pusher means is provided to cooperate with said elevator assembly to simultaneously push both rows of brick from the elevator assembly onto an adjacent receiving table. As the vertically spaced brick rows are pushed from the elevator assembly, the uppermost row falls onto the lowermost row to form a single row of bricks two courses high on the receiving table. As successive pairs of rows are discharged from the elevator assembly, they are pushed together to form a stack of bricks including a plurality of brick rows disposed in side-by-side relationship to form a two course high brick stack.

The elevator assembly of the present invention is disposed between a supply table and said receiving table, with the supply table functioning to receive an accumulation of brick rows with each brick row resulting from a slug being pushed through a cutter assembly disposed adjacent said supply table opposite said elevator assembly. Therefore, during the course of the operation of the brick handling and stacking apparatus of the present invention, a plurality of transversely extending brick rows normally occupy the supply table and form a group of bricks that is only one course high. While on the supply table and prior to stacking by the elevator assembly, the facial areas of the brick may be directly exposed to a desired type of texturizing operation.

It is, therefore, an object of the present invention to provide a method and apparatus for stacking brick into a two course high stack prior to transfer to a kiln car.

Another object of the present invention is to provide a new brick stacking apparatus of an elevator type stacker that is relatively simple, reliable, easy to maintain, and efficient and effective to form a two course high brick stack in a brick hacking operation.

Another object of the present invention is to provide a method and apparatus for handling and stacking bricks wherein single course rows of cut brick are allowed to accumulate prior to stacking in order that facial areas of the accumulated brick may be texturized prior to stacking and the transfer of such stacked brick to a kiln car.

A more particular object of the present invention is to provide a vertically cycleable elevator assembly for forming a two course brick stack or row that is efficient and which generally lends itself to high capacity brick production.

Still a further object of the present invention is to provide two course high brick stacking elevator assembly that is adapted to cycle back and forth between at least two positions and adapted to receive a row of bricks when disposed in each of the two positions, and further adapted to discharge both rows simultaneously in order that an upper disposed row falls onto and is supported by a lower disposed row as the two rows are simultaneously discharged from the elevator assembly.

Another object of the present invention is to provide a brick stacking elevator assembly of the type described in the immediate paragraph above wherein the elevator assembly is adapted to receive bricks simultaneously with the discharge of bricks from the elevator assembly.

Another object of the present invention is to provide a brick stacking apparatus of the character already described wherein the brick stacking apparatus not only has the capability to form two course high brick stacks but is also adapted to form single course high stacks in conventional fashion.

More particularly, it is an object of the present invention to provide a two course high brick stacking apparatus with a stacking elevator wherein the apparatus has the capability to push bricks directly through the elevator while in an inoperative mode in order that bricks can be transferred to a receiving table in single course layers.

Other objects and advantages of the present invention will become apparent from a study of the following description and the accompanying drawings which are merely illustrative of the present invention.

BRICK STACKING APPARATUS

With reference to the drawings, the brick stacking apparatus of the present invention is shown therein and indicated generally by the numeral 10. Prior to reviewing apparatus 10 in detail, it should be pointed out that the present invention deals with the handling and stacking of brick to form a generally rectangular two course high brick stack. After the two course high stack has been formed by apparatus 10 of the present invention, a conventional setter or gripper assembly such as that shown in U.S. Pat. No. 3,478,397 may be employed to transfer the formed stack onto a kiln car for curing and drying. Thus, principally the present invention relates to that part of a brick producing operation involving receiving a slug of extruded brick material and cutting the slug into a row of individual bricks, and the handling and stacking of the individual rows of cut brick to form a two course high generally rectangular stack of brick that once being formed is disposed adjacent the conventional setter or gripper assembly that acts to transfer the formed stack onto a kiln car.

Figure 1:
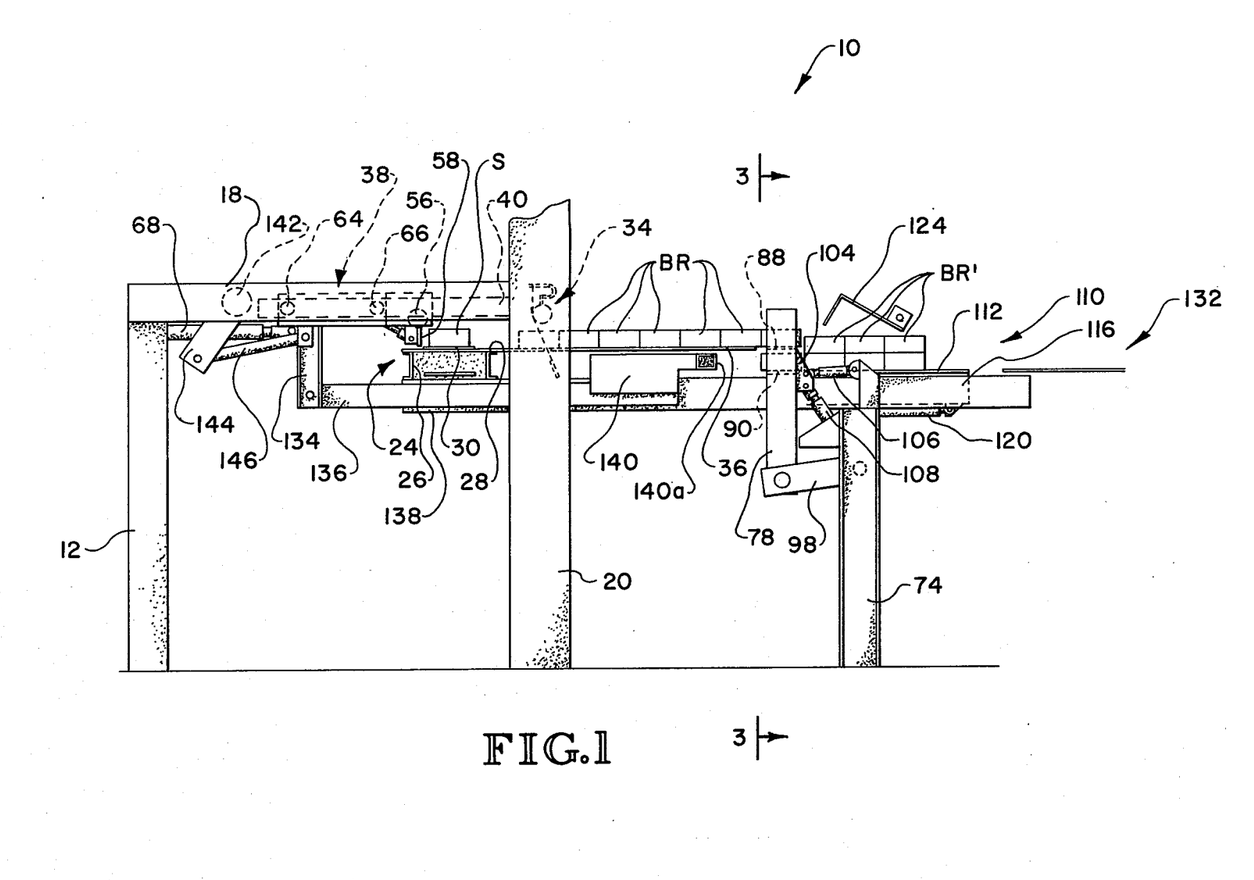
FIG. 1 is a side elevational view of the brick handling and stacking apparatus of the present invention.
Figure 2:
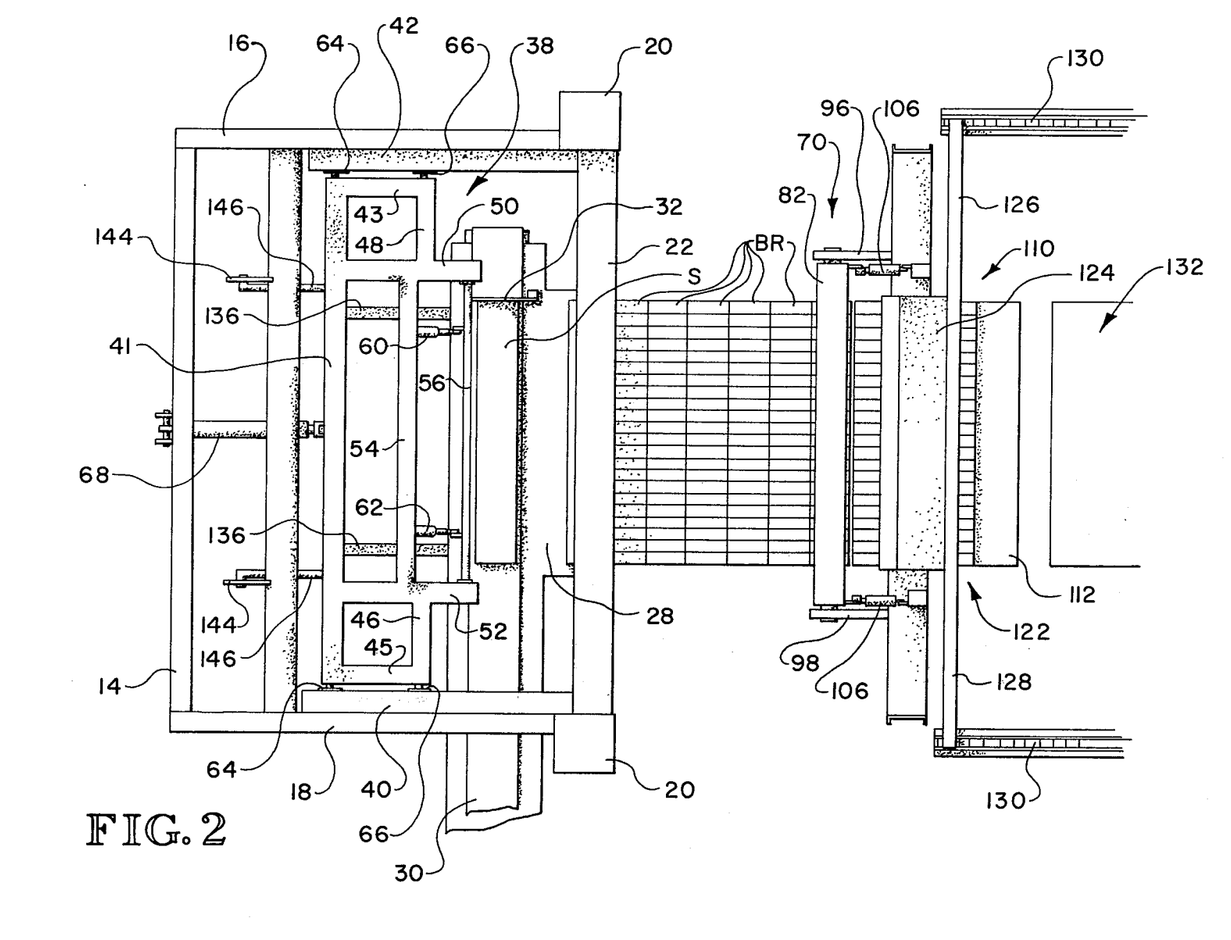
FIG. 2 is a top plan view of the brick handling and stacking apparatus shown in FIG. 1.

Viewing apparatus 10 as shown in FIGS. 1 and 2, the same is provided with a main frame structure including a pair of vertical support post 12 interconnected by a transversely extending cross beam 14. Secured about opposite ends of beam 14 and extending longitudinally therefrom is a pair of laterally spaced longitudinal members 16 and 18 that join intermediate support post 20 and wherein another cross beam 22 is interconnected between post 20 and extends in general parallel relationship with cross beam 14 to form a generally upstanding rectangular main frame, as illustrated in FIG. 2.

A slug conveyor, indicated generally by the numeral 24, is directed towards apparatus 10 such that the slug conveyor generally extends below the level of longitudinal members 16 and 18 adjacent the intermediate vertical post 20. Slug conveyor 24 includes a conveyor frame 26, an upper plate 28 that extends inwardly between intermediate post 20, and a driven belt 30 trained around the conveyor frame structure 26. Although not particularly shown, the brick material is extruded from an extrusion mill and cut into slugs S and each individual slug is delivered to a brick cutting position, as shown in FIG. 2, where a stop 32 engages the leading edge of the slug and stops the same along the driven belt 30.

Aligned with the stopped slug S and disposed generally between the intermediate support post 20 is a brick cutter assembly, indicated generally by the numeral 34, of the wire tension type. Details of the brick cutter assembly 34 will not be dealt with herein because such is not per se material to the present invention and since the structure of such stationary wire tension brick cutters is well known in the art. As will become apparent from subsequent portions of the present disclosure, after each slug reaches the stop position, as shown in FIG. 2, the slug is pushed towards the brick cutting assembly 34 and as each successive slug S is pushed through the brick cutting assembly 34, there is formed a row of cut brick with the row including a plurality of transversely aligned bricks and with each brick row being referred to by BR.

Disposed adjacent the brick cutting assembly 34, on the right side thereof as viewed in FIGS. 1 and 2 is a brick supply table 36 supported by the main frame structure of the apparatus 10. Supply table 36 is adapted to receive the individual brick rows BR that result from respective slugs S being pushed through the brick cutter assembly 34.

In order to push respective slugs S through the brick cutter assembly, apparatus 10 is provided with a first pusher means that is adapted to cycle longitudinally back and forth within the main frame structure of the apparatus, and during each cycle to engage a slug in the stopped position and to push the slug from the conveyor belt 30 onto upper plate 28 and the extending portions thereof towards the brick cutter assembly 34. Viewing the first pusher means in detail, it is seen that the same comprises a carriage assembly, indicated generally by the numeral 38, that is movably mounted within the main frame structure of the apparatus 10 and is movable fore and aftly during the brick handling and stacking operations to be herein described.

Carriage assembly 38 includes a pair of laterally spaced channel guides 40 and 42 secured adjacent respective longitudinal members 18 and 16 of the main frame structure of the apparatus 10. A carriage is constructed by the provision of a rear transverse member 41, a pair of longitudinal members 43 and 45 secured to opposite ends of the rear transverse member 41 and extending forwardly therefrom. Connected to the front ends of each of the longitudinal members 43 and 45 and extending inwardly therefrom is a pair of front partial transverse members 46 and 48 with the inwardmost ends of each of the partial transverse members being connected to a respective support arm 50 or 52 that is secured to the rear transverse member 41 and which extends forwardly therefrom in parallel relationship.

An intermediate transverse member 54 is secured transversely between the support arms 50 and 52. Rotatively mounted transversely between the support arms 50 and 52 is a rock shaft 56 that includes a transversely extending pusher plate 58 secured thereto. Carriage assembly 38 is so oriented within apparatus 10 such that pusher plate 58, when the same assumes its normal vertical position as shown in FIG. 1, aligns with a respective slug S that has reached the stop position because of the leading edge of the slug abuts against the stop plate 32 associated with the slug conveyor 24.

Each side of the carriage assembly 38 is provided with a pair of rollers 64 and 66 that are engaged and confined within a respective channel guide 40 or 42 in order to allow the entire carriage assembly 38 to move fore and aftly within the main frame structure of the apparatus 10.

Carriage assembly 38 is actuated by a remotely controlled main hydraulic drive cylinder 68 anchored at one end to cross beam 14 and extending therefrom where the other end of the hydraulic cylinder is connected to rear transverse member 41 of the carriage assembly 38.

Also provided as a part of the carriage assembly 38 is a pair of hydraulic cylinder 60 and 62 anchored to the intermediate transverse member 54 and extending therefrom where they operatively connect to the pusher plate 58. Hydraulic control cylinders 60 and 62 are remotely controlled in accordance with the movement of the carriage assembly such that when the pusher plate reaches its extended position and just prior to its return, the hydraulic cylinders are actuated such that the pusher plate 58 is rotated clockwise, as viewed in FIG. 1, about the axis of rock shaft 56 to where the pusher plate assumes a generally horizontal position. This horizontal position is maintained as the carriage assembly is retracted in order to avoid the possibility of the pusher plate 58 interfering with an oncoming slug S on the conveyor assembly 24. It follows that after the pusher plate has cleared the conveyor assembly 24 and is in the retracted position that the hydraulic cylinder 60 and 62 would be actuated to move the pusher plate from the horizontal position to the vertical position where the pusher plate would be suitable for engagement with the next slug S to push the same towards the brick cutter assembly 34.

It follows that as the carriage assembly 38 is moved fore and aftly that on each fore stroke that the pusher plate 58 engages a respective slug S and pushes the same towards the brick cutter assembly 34. As the carriage assembly 38 is continuously cycled, it follows that each slug being pushed through the brick cutting assembly 34 results in an individual brick row BR being accumulated on the supply table 36, as illustrated in FIG. 2.

From the supply table 36, it is desirable to stack the individual brick rows Br one on top of the other to form a second series of brick rows that are two courses high, the second series of two course high brick rows being referred to as BR'.

Figure 3:
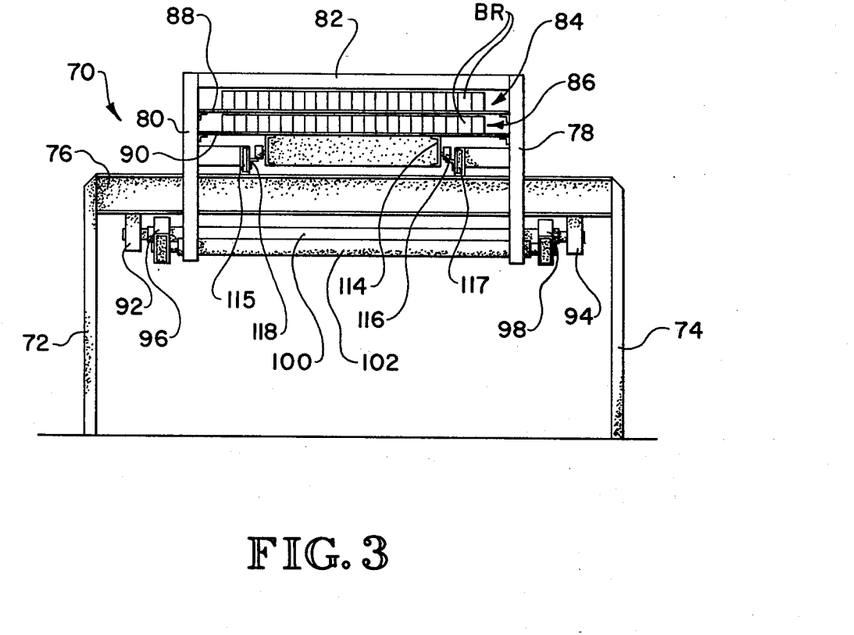
FIG. 3 is a transverse sectional view taken along the lines 3—3 of FIG. 1.

To stack the single course brick rows BR disposed on the supply table into two course high brick rows BR', the apparatus 10 of the present invention is provided with a stacking elevator assembly, indicated generally the numeral 70 and disposed about the terminal edge of the supply table 36 as illustrated in FIGS. 1 and 2. Viewing stacking elevator assembly 70 (as seen in FIG. 3), it is seen that the same is supported adjacent supply table 36 by a pair of vertical posts 72 and 74 interconnected by a transverse I-beam 76. To this frame structure, there is movably mounted an elevator including a pair of side members 78 and 80 interconnected by a top transverse member 82. Defined within the stacking elevator assembly is at least two receiving levels indicated generally by the numeral 84 and 86. Each receiving level is provided with a horizontal support and since the preferred embodiment illustrated in the drawings includes two receiving levels, two vertically spaced horizontal supports 88 and 90 are provided with each of the horizontal supports extending completely transversely between side members 78 and 80.

For supporting the stacking elevator assembly about the frame structure of posts 72 and 74, a pair of laterally spaced support blocks 92 and 94 are secured to transverse I-beam 76 and depend therefrom and wherein there is provided a main shaft rotatively journaled transversely between these support blocks. Fixed to shaft 100 and extending therefrom in lateral spaced apart relationship is a pair of support arms 96 and 98 that have shaft 102 rotatively secured therebetween and wherein the lower portions of the side members 78 and 80 are secured to shaft 102.

To actuate the elevator assembly 70 vertically up and down, there is provided on each side thereof a gusset 104 and operatively connected to the gusset 104 on each side is a tilt hydraulic cylinder 106 and a vertical raising and lowering hydraulic cylinder 108 that may also be referred to as a lift cylinder. Both hydraulic cylinders 106 and 108 are preferably controlled in time relationship with the drive of carriage assembly 38 such that both receiving levels 84 and 86 of the elevator assembly 70 may be filled by moving the elevator assembly between first and second receiving positions during the brick producing operation. The particular cycling of the elevator assembly 70 with respect to the movement of brick rows BR across the supply table 36 will be dealt with subsequently herein.

Disposed adjacent the stacking elevator assembly 70 opposite the supply table 36 is a receiving table assembly, indicated generally by the numeral 110. The receiving table assembly 110 is adapted to receive bricks discharged from the stacking elevator assembly during the operation of the apparatus 10 of the present invention. Receiving table assembly 110 includes a receiving table 112 supported by a carriage assembly 114 (as seen in FIG. 3) that is movable fore and aftly about angle iron guides 116 and 118 that are supported by beams 115 and 117 that form a part of the frame structure of the apparatus of the present invention. To actuate the carriage assembly 114, a remotely controlled hydraulic cylinder 120, as particularly illustrated in FIG. 1, is provided and the receiving table 112 is moved longitudinally back and forth in time relationship with the movement of the elevator assembly 70.

Disposed generally above receiving table 112 is a stack shifter, indicated generally by the numeral 122, that is particularly adapted to shift a plurality of two course high brick rows BR' from the receiving table 112 onto an adjacent receiving table 132 after a predetermined accumulation of two course high brick rows BR' occupy the receiving table 112. Details of table 132 will not be dealt with herein in great detail, because such is not per se material to the present invention and because such is well known in the brick production generally. However, as provided for in U.S. Pat. No. 3,478,397, table 132 may be of the spreader type such that after the two course high brick stack has been transferred thereto by the stack shifter 132, the table may spread the stack such that certain individual bricks of each transverse row may be separated from adjacent bricks of that row and the separated stack may be transferred to a kiln car by a conventional setter or gripper assembly such as that shown in the same patent.

Figure 6:
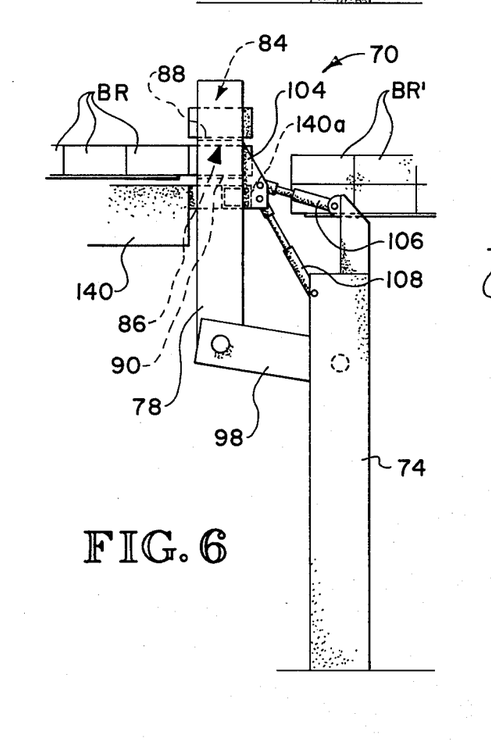

To provide for the simultaneous discharge of two brick rows BR received and supported within the elevator assembly 70, a second pusher means is provided with the apparatus and is particularly associated with the first pusher means including the pusher plate 58 and its associated carriage assembly 38 to simultaneously discharge two rows of bricks from the elevator assembly at any one time. Viewing the second pusher means in more detail, it is seen that the same includes a pair of laterally spaced legs 134 that are secured to the rear transverse member 41 of carriage assembly 38 and depend downwardly therefrom. Secured about the lower end of each leg 134 is a longitudinal beam 136 that extends forwardly therefrom and is supported and held in alignment by a guide channel 138 supported by the main frame structure of the apparatus 10 of the present invention. Secured transversely across the other end portion of the longitudinal beams 136 in a dog leg fashion is a pusher head 140. The pusher head 140 includes a transversely extending pusher bar 140a that is adapted to move fore and aftly generally underneath supply table 36 and to extend through the lower receiving level 86 of the elevator assembly on the extended stroke when the elevator assembly is positioned in the lower position, as illustrated in FIG. 1. When the elevator assembly 70 is raised to an upper position as illustrated in FIG. 6, the pusher bar 140a simply moves through the elevator assembly underneath the lower horizontal support 90.

To maintain carriage assembly 38 in alignment, there is provided a torsion shaft 142 rotatively journaled between longitudinal main frame members 16 and 18. Secured to the torsional shaft 142 is a pair of laterally spaced arms 144. Interconnected between each respective arm 144 and the carriage assembly 38 is a connecting link 146. Therefore, as the carriage assembly 38 cycles fore and aftly, it follows that the torsion shaft 146 oscillates back and forth because of the structural relationship of the connecting links 146 and the respective arms 144.

METHOD OF HANDLING AND STACKING BRICKS

In accordance with the present invention, the method of handling and stacking bricks entails extruding a continuous generally rectangular cross section of brick material from an extrusion mill in conventional fashion. Slugs of the extruded brick material are cut and are received and conveyed by the slug conveyor 24 to a cutting position, as illustrated in FIG. 2. Each slug reaches the cutting position when the leading edge thereof engages a stop 32 extending transversely across the slug bolt conveyor 24.

Once the slug S is in the stop position, hydraulic cylinder 68 is caused to be actuated so as to move the carriage assembly 38 right to left as viewed in FIG. 1. As the carriage assembly so moves, pusher plate 58 engages one side of the slug S and pushes the same from the conveyor belt 30 onto the upper plate 28 towards the cutter assembly 34. Once the pusher plate 58 has been extended its full stroke, hydraulic cylinder 68 is actuated so as to return carriage assembly 38. During the return, hydraulic cylinders 60 and 62 are actuated to move the pusher plate 58 from the vertical pushing position to a horizontal retracted position in order to avoid any possibility of interference between the pusher plate 58 and an oncoming slug on the slug conveyor 24. The cycling back and forth of the carriage assembly 38 is continued such that successive slugs S are pushed through the brick cutter assembly 34 to form a plurality of transversely disposed brick rows BR on the supply table 36.

Once supply table 36 is full and includes a brick row disposed adjacent the stacking elevator assembly 70, then the respective brick rows BR on the supply table are ready to be fed into the respective receiving levels of the stacking elevator assembly 70.

Figure 4:
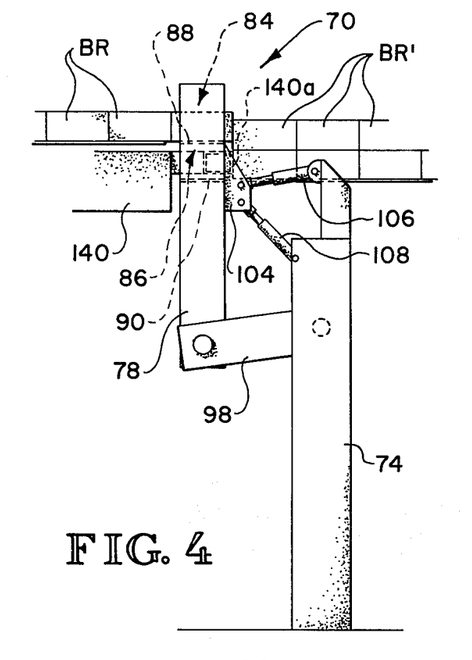
FIGS. 4 through 7 are a series of sequence views illustrating the stacking elevator assembly of the apparatus of the present invention and particularly illustrating the method of forming a two course high stack of brick in accordance with the present invention.
Figure 5:
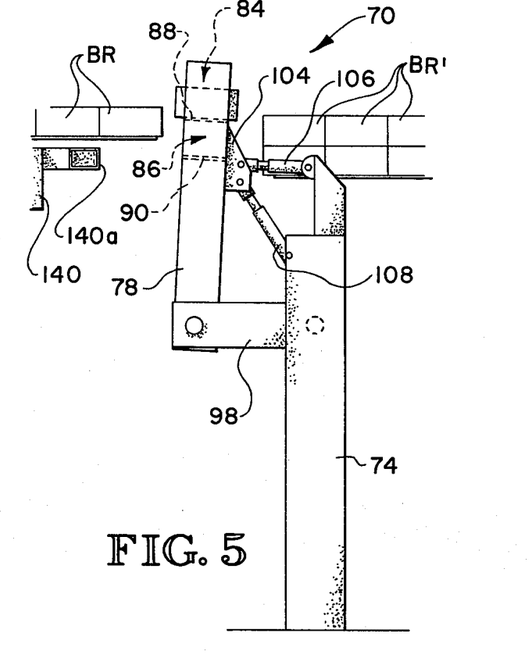

Turning to FIG. 4, the stacking elevator 70 is shown therein in a lower initial first position. In this lower initial position, the upper receiving level 84 of the stacking elevator assembly is aligned with the supply of bricks on the supply table 36. Consequently, the actuation of the carriage assembly 38 and the associated pusher plate 58 causes the adjacent end row of bricks to be pushed from the supply table 36 into the upper receiving level 84 of the elevator assembly 70 such that the received brick row is supported by the upper horizontal support 88.

After the upper receiving level 84 has been filled with a row of bricks, the receiving table assembly 110 is actuated by hydraulic cylinder 120 to move to the right, as viewed in FIGS. 4 through 7, so as to separate any bricks on the terminal edge of receiving table 112 from any bricks disposed in the stacking elevator assembly 70. Next, the tilt hydraulic cylinder 106 is actuated so as to swing the elevator assembly 70 clockwise with respect to the supply table 36 in order to create a space between the brick row received in the upper receiving level 84 and any adjacent bricks on the supply table 36. This is particularly illustrated in FIG. 5.

Now elevator assembly 70 can be actuated upwardly without any adjacent interference to an upper position where the second receiving level 86 aligns with the supply of bricks on the supply table 36, as illustrated in FIG. 6. After the elevator assembly 70 reaches the upper position, the carriage assembly 38 is once again actuated causing the row of bricks disposed along the adjacent terminal edge of the supply table 36 to be pushed into the lower receiving level 86 of the elevator assembly. Because the second pusher means and particularly the pusher head 140 is actuated in unison with the carriage assembly 38, it is seen that the pusher head 140 and the front pusher bar 140a is actuated such that it extends through the elevator assembly 70 just below the lower receiving level 86. At this point, it is appreciated that both the upper and lower receiving levels 84 and 86 are filled with a respective row of brick.

Figure 7:
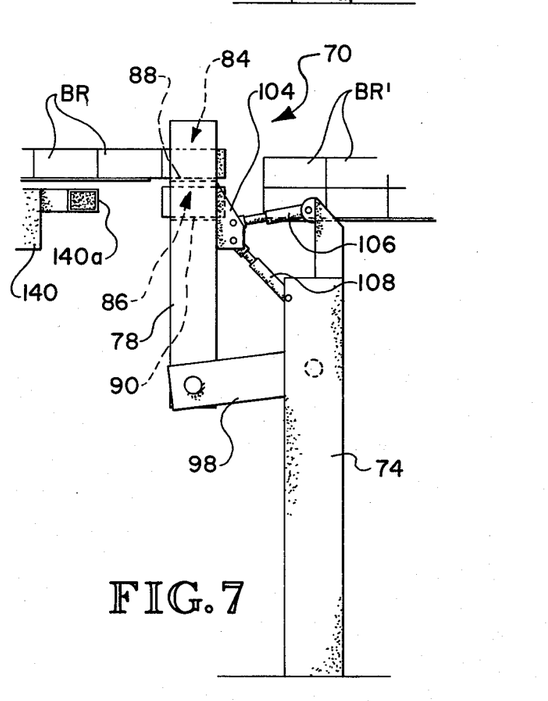

After this, the tilt cylinders 106 are actuated such that the row of bricks within the lower receiving level 86 is separated from the adjacent row of bricks on the supply table 36, and then cylinders 108 are actuated such that the elevator assembly is lowered to the lower position, as illustrated in FIGS. 4 and 7, where the supply of brick on the supply table 36 aligns with the upper receiving level 84. Once the elevator assembly is in the lower position, the receiving table assembly 110 is actuated towards the left as viewed in FIG. 7 and caused to move to where the adjacent terminal edge of the receiving table 112 lies directly adjacent the bricks within the elevator assembly 70, as indicated in FIG. 4. At this position, both the pusher plate 58 and the pusher head 140 is in the retracted position. The actuation of the carriage assembly 38 causes the respective brick rows BR to be advanced along the supply table 36 causing the upper row of bricks to be pushed from the upper receiving level 84 of the elevator assembly 70. Simultaneously with this, the carriage assembly 38 causes the pusher head 140 to be extended so as to engage the row of bricks within the lower receiving level 86 and causes this row to be discharged from the elevator assembly 70 simultaneously with the discharge of the upper brick row therein. Since both the upper and lower brick rows are simultaneously discharged, it is seen that the upper row falls onto the lower row during the discharge and because of the position of the receiving table 112, the discharge results in a two course high brick row or stack being transferred onto the adjacent terminal edge of the receiving table 112 causing any bricks already thereon to be pushed towards the right.

The above operation is continued so as to form a plurality of two course high brick rows BR' on the receiving table 112.

After a predetermined number of brick have been received on the receiving table 112, the stack shifter 122 is actuated and during actuation, the puller arm 124 engages the rows of bricks on the left side of the receiving table 112 (as viewed in FIG. 1) and the puller arm 124 is actuated right to left (again as viewed in FIGS. 1 and 2) causing the formed stack of bricks to be transferred to the adjacent table 132 where the stack of bricks may be engaged by a conventional brick setter or gripper assembly and appropriately transferred to a kiln car.

It is, therefore, appreciated that the method and apparatus of the present invention presents a means of handling and stacking brick in such a manner that individual brick rows may be formed into two course high rows of bricks and accumulated for appropriate transfer to a kiln car. It is particularly noted that the apparatus described herein allows for a single course accumulation of brick to be disposed on a supply table such that the upper facial edges of the brick may be directly exposed to a texturizing operation prior to the stacking thereof into two course high stacks. In addition, it is appreciated that the apparatus of the present invention presents a relatively simple, reliable, and durable means for handling brick prior to the transfer to a kiln car and in particularly between the area where each slug is cut into a row of brick and where the respective rows of brick are formed into a stack that is at least two courses high.

With reference to FIGS. 8 through 12, a second species of the brick stacking apparatus 10 of the present invention is disclosed therein. Structurally the second species differs from the embodiment shown in FIG. 1 by the provision of an upper pusher assembly 160 that cooperates with pusher 58 in lieu of pusher 140. Further, the supply table 36 and the receiving table 112 are horizontally aligned, and, therefore, it is appreciated that bricks BR on the supply table 36 can be directly transferred through the elevator assembly 70 (while in an inoperative mode) onto the receiving table 112 in conventional single course fashion. Consequently, it is appreciated that where it is desired to transfer bricks onto the receiving table 112 in conventional single course fashion, that this can be achieved with the apparatus of the present invention by simply pushing the individual bricks through the stationary elevator assembly 70 onto the receiving table 112, although the same brick stacking apparatus of the second species can be used, as will be described subsequently herein, to form a two course high stack of bricks on the receiving table 112.

The following discussion will deal principally with the second species of the brick stacking apparatus 10 and the structure thereof not specifically found in the embodiment illustrated in FIGS. 1 through 7. It will be understood, however, from a study of the drawings that the brick stacking apparatus shown in FIGS. 1 through 7 and the brick stacking apparatus of the second species illustrated in FIGS. 8 through 12 are in many respects identical in structure and function. Thus, a discussion with respect to such common structure will not be dealt with here in detail because such has already been discussed hereinabove.

Figure 8:
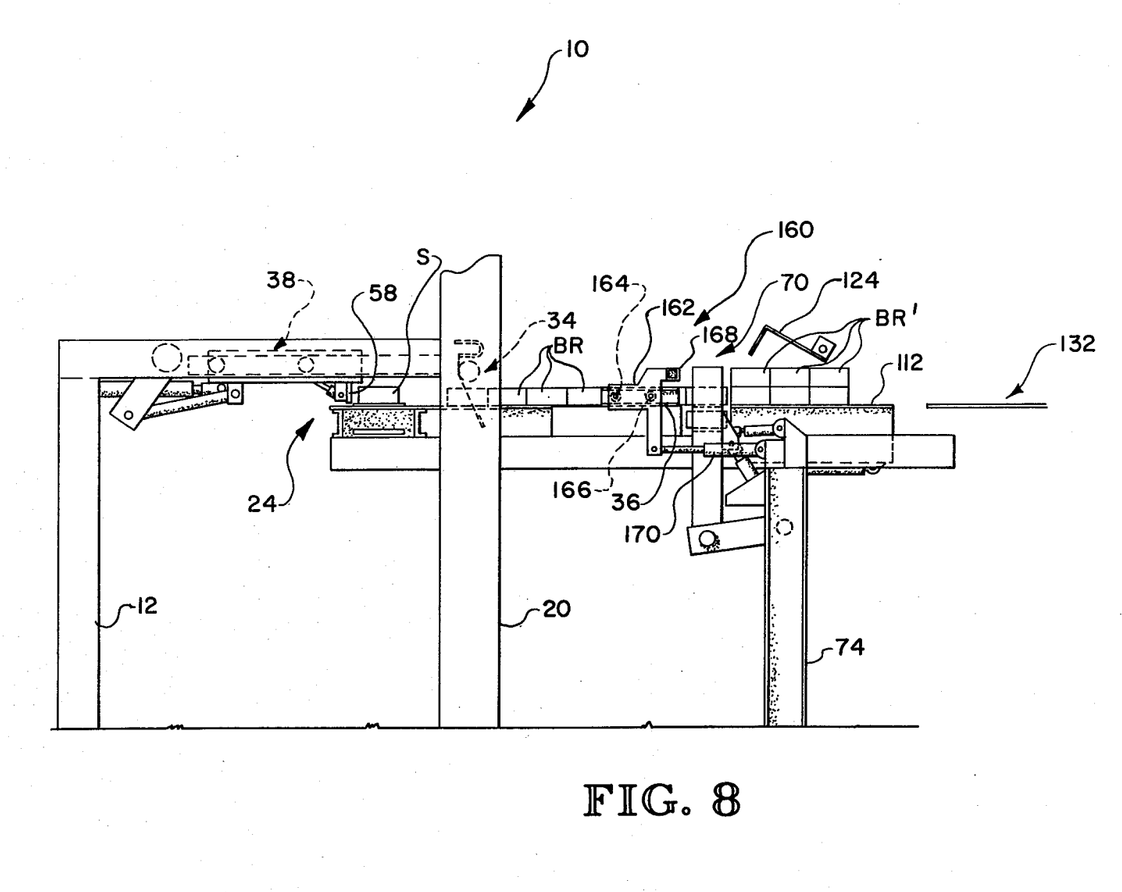
FIG. 8 is a side elevational view of a second species of the brick stacking apparatus of the present invention.

With particular reference to FIG. 8, the second species comprises a second pusher assembly, indicated generally by the numeral 160, that is adapted to move fore-and-aftly generally above the supply table 36. Second pusher assembly 160 comprises a carriage frame 162 that expands and straddles the supply of brick BR disposed on the supply table 36, and the carriage frame 162 includes a pair of rollers on each side thereof, 164 and 166, with the rollers being confined within a guide channel disposed on each side of the supply table and supported by the frame structure of the brick stacking apparatus 10. For engaging the upper row of bricks in the elevator assembly 70, the second pusher assembly 160 includes a transverse pusher 168 that extends substantially the entire width of the brick stacking assembly 10 and is adapted during operation to selectively engage the upper row of brick BR disposed on the upper support 88 of the elevator assembly 70. It is appreciated that pusher 168 is disposed above the normal level of the bricks BR on the supply table 36, as contrasted to pusher 140a shown in FIG. 1 which is disposed below the level of bricks BR on the supply table 36.

To actuate second pusher assembly 160 fore-and-aftly, the same is provided with a pair of hydraulic cylinders, each cylinder being disposed upon a respective side of the brick stacking apparatus and indicated by the numeral 170. While various control systems may be employed, one design would entail the hydraulic cylinders 170 being operably associated with the main hydraulic cylinder 68 in order to be actuated and operated in time relationship thereto. Although details of this time relationship control system is not shown herein in detail, it will be appreciated that by the provision of conventional hydraulic controls that the second pusher assembly 160 can be made to operate in a specific time relationship with the main hydrulic cylinder 68. Unlike pusher 140a, the second pusher assembly 160 of the second species would only cycle every other time with respect to the main hydraulic cylinder 68, and this can be provided by an electrically operated directional valve operatively connected between hydraulic cylinders 170 and main hydraulic cylinder 68. Other design considerations such as stroke, cushioning, etc., are simply design considerations not per se material to the present invention.

To illustrate the operation and basic function of the second species, one is referred to the sequence of views illustrated in FIGS. 9 through 12. In illustrating the operation of the second species, our discussion began with the elevator assembly 70 in a lowered position with the upper level or upper support 88 just receiving a row of bricks BR$_2$. Just prior to this, the elevator assembly 70 was in an upper elevated position and a first row of brick BR$_1$, was pushed onto the lower support 90 from the supply table 36 indirectly by the pusher 58.

Figure 10:
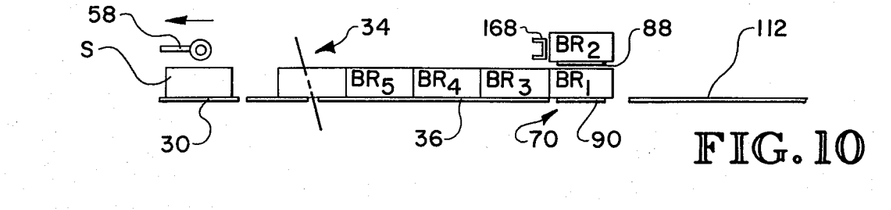

After brick row BR$_2$ has been received on the upper support 88, the elevator assembly 70 cycles to an elevated position, as shown in FIG. 10. During this time the pusher 168 remains stationary while the main pusher 58 is recycled back to an initial position.

Figure 11:
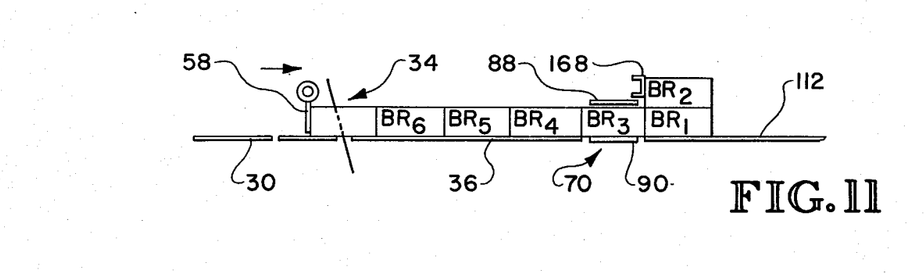

Once the elevator assembly 70 has reached the elevated position, then the main pusher 58 and pusher 168 are simultaneously actuated, as illustrated in FIG. 11, causing the two rows of brick BR$_1$ and BR$_2$ to be pushed from the elevator assembly 70 onto the receiving table 112. During this operation, it is appreciated that another row of bricks BR$_3$ is pushed from the supply table 36 onto the lower support 90 of the elevator assembly 70.

Figure 9:
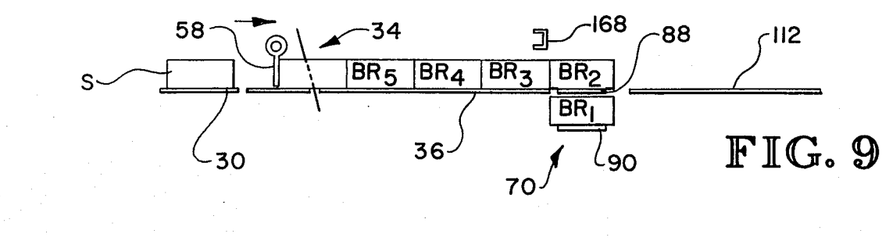
FIGS. 9 through 12 are a series of views illustrating the basic operation of the second species of the brick stacking apparatus shown in FIG. 8.
Figure 12:
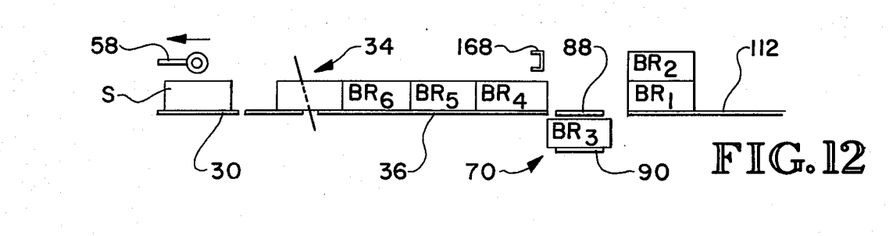

After row BR$_3$ is received by the elevator assembly 70, the elevator assembly 70 then moves to a downward or lower position. As the elevator assembly moves to this lower position, as illustrated in FIG. 12, pusher 168 is allowed to return to its initial position, as shown in FIGS. 9 and 12, and this can be provided for by allowing the upper compartment of the elevator assembly 70 to have an open top and consequently there would be no interference between pusher 168 and the elevator assembly 70. Once the elevator assembly 70 has reached its lower position, and the main pusher 58 has returned to its initial forward pushing position (to the left of belt 30), then the pusher 58 may engage the slug S disposed on the off bearing belt 30 and push the same, left to right as viewed in FIGS. 9 through 12, causing a fourth brick row BR$_4$ to be moved from the supply table 36 onto the upper support 88 of the elevator assembly 70. This basic operation as described above and as illustrated in FIGS. 9 through 12 is continued until a series of brick rows have been received on the receiving table 112. As already described with respect to the brick stacking apparatus shown in FIGS. 1 through 7, puller 124 is then caused to engage the series of brick rows on the supply table 112 and to pull them onto an adjacent table, forming a part of the receiving table assembly indicated generally by the numeral 132 in FIG. 1. As was the case with the embodiment illustrated in FIG. 1, the receiving table 112 is adapted to move left to right with respect to the elevator assembly 70, at selected times in order that the puller 124 can engage the side of the brick stack adjacent the elevator assembly 70.

One particular feature of the second species described in FIGS. 8 through 12 that is worthy of noting is the feature that allows bricks, if desired, to be transferred through the elevator assembly 70 onto the receiving table 112 in a single course high tier. Therefore, the brick stacking apparatus of the present invention can be utilized for either double course high stacking as well as single course high stacking.

The terms "upper", "lower", "forward", "rearward", etc., have been used herein merely for the convenience of the foregoing specification and in the appended Claims to describe the method and apparatus of the present invention and its parts as oriented in the drawings. It is to be understood, however, that these terms are in no way limiting to the invention since the apparatus may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

What is claimed is:

1. A brick stacking apparatus for receiving bricks from supply means and transferring the bricks to a receiving table in a manner that results in the transferred bricks forming at least a two course high stack on said receiving table, said brick stacking apparatus comprising: an elevator assembly adapted to be operatively mounted between said supply means and said receiving table for receiving bricks from said supply means and transferring the received bricks to said receiving table, said elevator assembly including at least two vertically spaced brick receiving levels with each receiving level including a generally horizontal support member for supporting bricks received within that receiving level; actuating means operatively connected to said elevator assembly for moving said elevator assembly and the receiving levels thereof between at least two vertically spaced positions wherein at each position at least one receiving level of said elevator assembly aligns with said supply means; and transfer means for transferring bricks from said supply means to respective receiving levels of said elevator assembly in response to respective levels of said elevator assembly aligning with said supply means as said elevator assembly is actuated between said at least two vertically spaced positions, said transfer means further including means for simultaneously transferring bricks from at least the two receiving levels of said elevator assembly to said receiving table, whereby successive transfers from said elevator assembly to said receiving table results in an at least a two course high brick stack being formed on said receiving table.

2. The brick stacking apparatus of claim 1 wherein said supply means includes a supply table and wherein said transfer means includes a first pusher operative to push a single course formation of brick across said supply table and drive means for driving said first pusher in a predetermined time relationship relative to the vertical movement of said elevator assembly such that actuation of said first pusher results in certain bricks on the supply table being pushed into an aligned receiving level of said elevator assembly.

3. The brick stacking apparatus of claim 2 wherein said transfer means includes a second pusher cooperative with said first pusher to simultaneously cause the transfer of bricks from at least two levels of said elevator assembly onto said receiving table; and wherein said second pusher is operatively driven by said drive means that drives said first pusher such that said first and second pushers may be driven in unison.

4. The brick stacking apparatus of claim 3 wherein said first pusher acts to successively transfer bricks to each of the two receiving levels of said elevator assembly as the respective receiving levels align with bricks on said supply table during the vertical movement of said elevator assembly; and wherein the movement relationship of said elevator assembly and said first and second pushers are such that bricks in the two vertically spaced receiving levels are pushed from the elevator assembly simultaneously by (1) bricks entering one receiving level due to the actuation of said first pusher and the resulting movement of bricks from said supply table into that one receiving level, and (2) by the direct engagement of bricks in the other receiving level by said second pusher, wherein the exiting bricks from the uppermost disposed receiving level of said elevator assembly to form a two course high brick stack on said receiving table.

5. The brick stacking apparatus of claim 4 wherein said actuating means for moving said elevator assembly vertically includes means for separating brick within any receiving level thereof from adjacent brick on said supply table before said elevator assembly begins any substantial vertical movement.

6. The brick stacking apparatus of claim 5 wherein said actuating means includes lift cylinder means and tilt cylinder means cooperative to tilt said elevator assembly prior to substantial vertical movement, with said tilt cylinder means acting to generally separate said elevator assembly from the brick disposed on said supply table prior to said elevator assembly being moved vertically by said lift cylinder means.

7. The brick stacking apparatus of claim 6 wherein said elevator assembly includes base support means for generally supporting said elevator assembly, a pair of laterally spaced support arms pivotably mounted about a transverse axis to said base support means; and wherein said elevator assembly includes a pair of laterally spaced side members extending along the sides of said elevator assembly and secured to said support arms.

8. The brick stacking apparatus of claim 7 wherein a torsion member extends between lower portions of said laterally spaced side members of said elevator assembly for generally giving said elevator assembly rigidity.

9. The brick stacking apparatus of claim 7 wherein said lift cylinder means and said tilt cylinder means are operatively connected between said base support means of said elevator assembly and said laterally spaced side members.

10. The brick stacking apparatus of claim 4 further including a main carriage frame structure with a carriage movably mounted therein and actuated back and forth by hydraulic cylinder means operatively connected between said main carriage frame structure and said carriage, and wherein both said first and second pushers are operatively connected to and driven by said carriage.

11. The brick stacking apparatus of claim 10 wherein said second pusher includes a pusher member, an elongated longitudinally disposed pusher beam having said pusher member secured about one end thereof, guide means engaged with said elongated longitudinal beam and supported by said main frame carriage structure for guiding said beam as it is moved back and forth, and means for interconnecting said carriage with said elongated longitudinally disposed beam for causing said beam and said pusher member to be actuated back and forth in accordance with the movement of said carriage.

12. The brick stacking apparatus of claim 11 wherein there is provided a torsion alignment mechanism operatively connected on each side of said carriage and generally connected between said main carriage frame structure and said carriage.

13. The brick stacking apparatus of claim 12 wherein said torsion alignment mechanism comprises a torsion member rotatively mounted transversely within said main carriage frame structure and including on each side thereof a crank arm fixed to said torsion member and extending therefrom; and a connecting link operatively connected between said crank arm and said carriage such that as said carriage moves back and forth within said main carriage frame structure said torsion alignment mechanism tends to maintain said carriage generally squarely within said main carriage frame structure.

14. A brick handling and stacking apparatus comprising:
(a) conveyor means for conveying individual brick slugs to a cutting area;
(b) cutting means associated with said brick handling and stacking apparatus;
(c) a supply table disposed adjacent said cutting means for receiving and supporting individual rows of cut brick after the brick have been moved through said cutting means;
(d) a first pusher means for engaging each brick slug delivered to said cutting area and for pushing the engaged slug towards said cutting means such that successive strokes by said first pusher means results in a series of slugs being pushed through said cutting means for cutting each slug into a series of brick and onto said supply table to form a series of transversely aligned brick rows with each row of brick including a series of individual bricks disposed in side-by-side relationship;
(e) a stacking elevator assembly movably mounted adjacent said supply table and including a lower and an upper receiving level with each receiving level being adapted to receive at least one row of bricks formed on said supply table;
(f) means for moving said stacking elevator assembly between at least two positions wherein in each position a respective receiving level is aligned with the bricks on said supply table;
(g) said first pusher means including drive means for driving the same in time relationship with the movement of said stacking elevator assembly such that during operation said first pusher means is operative to move at least one row of bricks from said supply table into the particularly aligned receiving level of said elevator assembly;
(h) a receiving table disposed adjacent said stacking elevator assembly opposite said supply table for receiving bricks from said elevator assembly;
(i) second pusher means movable between a retracted position and an extended position wherein in moving from said retracted position to said extended position said second pusher means is operative when aligned with a respective receiving level of said stacking elevator assembly to engage the bricks within said receiving level and to push these bricks therefrom onto said receiving table; and
(j) wherein said second pusher means includes drive means for driving the same in timed relationship with said first pusher means and said stacking elevator assembly such that said first and second pusher means are cooperative to simultaneously act to discharge bricks from both said lower and upper receiving levels of said stacking elevator assembly onto said receiving table as during each cycle of said elevator assembly said second pusher means engages bricks in one receiving level and pushes such bricks onto said receiving table while bricks in the other receiving level of said stacking elevator assembly are displaced therefrom by a row of bricks being pushed into that receiving level by said first pusher means, whereby the bricks being pushed from the lower receiving level to form a two course high brick stack during the continuous operation of the brick handling and stacking apparatus.

15. The brick handling and stacking apparatus of claim 14 wherein said means for moving said elevator assembly between the at least two positions includes means for providing relative horizontal movement between said elevator assembly and adjacent bricks on said supply table prior to substantial vertical movement of the elevator assembly in order to avoid interference between bricks received within said elevator assembly and adjacent bricks disposed on said supply table.

16. The brick handling and stacking apparatus of claim 14 wherein said first and second pusher means are operatively connected together to move in unison, and wherein said means for driving said first pusher means and said means for driving said second pusher means comprises at least one hydraulic cylinder operative to drive both said first and second pusher means back and forth in unison.

17. The brick handling and stacking apparatus of claim 16 wherein said receiving table is provided with drive means for driving said receiving table back and forth relative to said elevator assembly for providing a separation space between bricks within said elevator assembly and adjacent bricks disposed on said receiving table prior to substantial vertical movement of said elevator assembly in order to avoid interference between bricks within said elevator assembly and adjacent bricks disposed on said receiving table resulting from relative vertical movement of said elevator assembly.

18. The brick handling and stacking assembly of claim 14 wherein said drive means for moving said elevator assembly between the at least two positions includes first hydraulic cylinder means operatively connected to said elevator assembly for moving said elevator assembly generally horizontally relative to said supply table, and second hydraulic cylinder means operatively connected to said elevator assembly for moving said elevator assembly generally vertically relative to said supply table, whereby said first and second hydraulic cylinder means cooperate to separate said elevator assembly from adjacent bricks on said supply table prior to moving said elevator assembly between said at least two vertically spaced positions during the operation of said brick handling and stacking apparatus.

19. A brick stacking apparatus for forming bricks into at least a two course high stack, comprising: an elevator assembly vertically movable between at least two positions and including a lower brick receiving level and an upper brick receiving level; first drive means for moving said elevator assembly between said at least two positions; first pusher means for effectively pushing a supply of brick towards said elevator assembly and particularly adapted to effectively push brick into each receiving level of said elevator assembly as each respective receiving level is moved into a position where that respective receiving level aligns with the supply of brick being pushed by said first pusher means; second pusher means driven in time relationship with said first pusher means and cooperative with said first pusher means to effectively cause the simultaneous transfer of bricks from both said upper and lower receiving levels of said elevator assembly, said second pusher means normally aligned with said elevator assembly so as to engage bricks in a respective receiving level therein and to push brick from that respective receiving level while bricks in the upper receiving level are being displaced by bricks being pushed into that receiving level by said first pusher means, resulting in bricks in both upper and lower receiving levels being simultaneously discharged from said elevator assembly with the bricks in the upper level dropping onto the bricks in the lower receiving level as the bricks in each receiving level are simultaneously discharged; and a receiving table disposed adjacent said elevator assembly for receiving bricks being discharged thereby.

20. A method of handling and stacking bricks comprising the steps of: aligning a first receiving level of an elevator assembly with a supply of bricks; transferring a first row of bricks into the first receiving level of said elevator assembly; moving said elevator assembly to a second position with respect to the supply of bricks such that a second receiving level thereof aligns with said supply of bricks; transferring a second row of bricks into the second receiving level of said elevator assembly; and simultaneously pushing both rows of brick from the respective receiving levels of said elevator assembly onto an adjacent receiving table whereby the uppermost row of brick fall onto the lowermost row of brick as both rows of brick are simultaneously pushed and discharged from said elevator assembly so as to form a stack of brick at least two courses high.

21. The method of handling and stacking bricks of claim 20 wherein prior to moving said elevator assembly to said second position the method includes separating the first row of brick received in said first receiving level of said elevator assembly from adjacent bricks of said brick supply in order that said elevator assembly may be moved to said second position without significant interference between the first row of bricks received in the first receiving level and adjacent bricks of the brick supply.

22. The method of handling and stacking bricks of claim 21 wherein prior to the transfer of brick into said elevator assembly said method includes: receiving a slug of brick material; and pushing each slug through cutting means to form a row of individual bricks.

23. The method of claim 20 as set forth therein wherein a first row of bricks is transferred into a lower level of said elevator assembly while said elevator assembly is disposed in an upper position; moving said elevator assembly to a lower position; transferring another row of brick into an upper receiving level of said elevator while said elevator assembly is in said lower position; moving said elevator assembly back to an upper position; and simultaneously engaging the brick within said upper receiving level, and pushing another row of brick into the lower level of said elevator assembly causing the brick therein to be pushed therefrom as the brick row thereabove in said upper receiving level is pushed from the elevator assembly, such that the upper brick row falls onto the lower brick row as the two rows are simultaneously discharged from the elevator assembly.

24. A brick stacking apparatus for forming bricks into at least a two course high stack, comprising: an elevator assembly vertically movable between at least two positions and including a lower brick receiving level and an upper brick receiving level; first drive means for moving said elevator assembly between said at least two positions; a supply table disposed adjacent said elevator assembly; first pusher means for effectively pushing a supply of brick onto said supply table and thereacross towards said elevator assembly and particularly adapted to effectively push brick into each receiving level of said elevator assembly as each respective receiving level is moved into a position where that respective receiving level aligns with the supply of brick being pushed by said first pusher means across said supply table; second pusher means disposed above said supply table and driven in time relationship with said first pusher means and cooperative with said first pusher means to effectively cause the simultaneous transfer of bricks from both said upper and lower receiving levels of said elevator assembly, said second pusher means normally aligned with said elevator assembly so as to engage bricks in said upper receiving level therein and to push brick from that upper receiving level while bricks in the lower receiving level are being displaced by bricks being pushed from said supply table into that receiving level by said first pusher means, resulting in bricks in both upper and lower receiving levels being simultaneously discharged from said elevator assembly with the bricks in the upper level dropping onto the bricks in the lower receiving level as the bricks in each receiving level are simultaneously discharged; and a receiving table disposed adjacent said elevator assembly for receiving bricks being discharged thereby.

25. The brick stacking apparatus of claim 24 wherein said second pusher means includes a carriage frame movably mounted fore-and-aft movement about said brick stacking apparatus above said supply table; and wherein said carriage frame includes a transverse pusher adapted to horizontally align with the upper level of said elevator assembly when said elevator assembly is disposed in an upper position.

* * * * *

REEXAMINATION CERTIFICATE (50th)

United States Patent [19]
Lineberry et al.

[11] B1 4,173,910
[45] Certificate Issued Feb. 1, 1983

[54] METHOD AND APPARATUS FOR HANDLING BRICK

[75] Inventors: Cletus E. Lineberrry, Staley; John G. Buckner, Ramseur; Jimmy W. Harris, Silver City, all of N.C.

[73] Assignee: Auto-Systems and Service, Inc., Staley, N.C.

Reexamination Request
No. 90/000,106, Nov. 12, 1981

Reexamination Certificate for:
Patent No.: 4,173,910
Issued: Nov. 13, 1979
Appl. No.: 910,646
Filed: May 30, 1978

Related U.S. Application Data

[63] Continuation-in-part of Ser. No. 854,150, Nov. 23, 1977, abandoned.

[51] Int. Cl.³ .................. B26D 7/06; B28B 11/14
[52] U.S. ... 83/29; 83/87; 83/90; 83/419; 83/425.2; 83/651.1; 414/95
[58] Field of Search ... 83/29, 87, 90, 419, 83/425.2, 651.1, 91, 96; 414/41, 46, 52, 96, 95; 198/419, 422; 53/535, 152, 153

[56] References Cited

U.S. PATENT DOCUMENTS

| | | |
|---|---|---|
| Re. 28,160 | 9/1974 | Lingl. |
| 2,649,231 | 8/1953 | Ferguson et al. |
| 2,917,991 | 12/1959 | Segar ................ 414/52 X |
| 2,924,051 | 2/1960 | More. |
| 3,220,570 | 11/1965 | Swanson et al. |
| 3,250,376 | 5/1966 | Griner et al. |
| 3,474,917 | 10/1969 | Pearne et al. |
| 3,478,896 | 11/1969 | Pearne ................ 414/60 |
| 3,589,495 | 6/1971 | Pearne et al. |
| 3,729,084 | 4/1973 | Stuart et al. |
| 3,964,597 | 6/1976 | Brown et al. |
| 4,235,329 | 11/1980 | Crawford et al. .......... 198/422 X |

*Primary Examiner*—Frank T. Yost

[57] ABSTRACT

The present invention relates to a method and apparatus for hacking brick specifically involving the stacking of uncured or green brick into a two course high brick stack prior to the bricks being transferred and stacked onto a kiln car for curing and drying. As a part of the method and apparatus of the present invention, slugs of brick material are received and successively pushed by a first pusher through a wire type brick cutter onto a receiving table, each slug resulting in a series of aligned bricks disposed in side-by-side relationship and referred to as a brick row. A vertically movable elevator assembly is mounted adjacent the supply table and includes at least two vertically spaced receiving levels formed therein with each receiving level being adapted to receive and support a row of bricks. As the elevator assembly is actuated up and down, individual brick rows are pushed into each of the respective receiving levels of the elevator assembly. A second pusher is cooperable with said first pusher to effectively simultaneously discharge both rows of bricks from said elevator assembly onto an adjacent receiving table with the uppermost row of brick falling onto and being supported by the lowermost row of brick to form a two course high brick stack. Successive discharges from the elevator assembly result in a multi-row or column two course high brick stack being formed on the receiving table such that after a predetermined size stack of brick have been formed on the receiving table such may be transferred by a conventional setter from the receiving table onto a kiln car.

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEEXAMINATION, IT HAS BEEN DETERMINED THAT:

The patentability of claims 14-19, 24 and 25 is confirmed.

Claims 2, 3, 4, and 20, having been finally determined to be unpatentable, are canceled.

Claims 1, 5, 10, 21 and 23 are determined to be patentable as amended:

1. A brick stacking apparatus for receiving bricks from supply means and transferring the bricks to a receiving table in a manner that results in the transferred bricks forming at least a two course high stack on said receiving table, said brick stacking apparatus comprising: an elevator assembly adapted to be operatively mounted between said supply means and said receiving table for receiving bricks from said supply means and transferring the received bricks to said receiving table, said elevator assembly including at least two vertically spaced brick receiving levels with each receiving level including a generally horizontal support member for supporting bricks received within that receiving level; actuating means operatively connected to said elevator assembly for moving said elevator assembly and the receiving levels thereof between at least two vertically spaced positions wherein at each position at least one receiving level of said elevator assembly aligns with said supply means; and [transfer means for transferring bricks from said supply means to respective receiving levels of said elevator assembly in response to respective levels of said elevator assembly aligning with said supply means as said elevator assembly is actuated between said at least two vertically spaced positions, said tranfer means further including means for simultaneously transferring bricks from at least the two receiving levels of said elevator assembly to said receiving table, whereby successive transfers from said elevator assembly to said receiving table results in an at least a two course high brick stack being formed on said receiving table] *transfer means for transferring bricks from said supply means to respective receiving levels of said elevator assembly and for simultaneously transferring bricks from at least the two receiving levels of said elevator assembly to said receiving table, said transfer means including a first pusher operative to push a single course formation of brick across said supply means and drive means for driving said first pusher in a predetermined time relationship relative to the vertical movement of said elevator assembly such that the actuation of said first pusher results in certain bricks on said supply means being pushed into an aligned receiving level of said elevator whereby said first pusher acts to successfully transfer bricks to each of the two receiving levels of said elevator assembly as the respective receiving levels align with bricks on said supply means during the vertical movement of said elevator assembly; said transfer means further including a second pusher cooperative with said first pusher to simultaneously cause the transfer of bricks from at least two levels of said elevator assembly onto said receiving table and drive means for driving said second pusher in a predetermined time relationship relative to the vertical movement of said elevator assembly and the actuation of said first pusher; and wherein the movement relationship of said elevator assembly and said first and second pushes are such that bricks in the two vertically spaced receiving levels are pushed from the elevator assembly simultaneously by (1) bricks entering one receiving level due to the actuation of said first pusher and the resulting movement of bricks from said supply means into that one receiving level, and (2) by the direct engagement of bricks in the other receiving level by said second pusher, wherein the existing bricks from the uppermost disposed receiving level of said elevator assembly fall onto the exiting bricks from the lowermost disposed receiving level of said elevator assembly to form a two course high brick stack on said receiving table.*

5. The brick stacking apparatus of claim [4] *1* wherein said actuating means for moving said elevator assembly vertically includes means for separating brick within any receiving level thereof from adjacent brick on said supply table before said elevator assembly begins any substantial vertical movement.

10. The brick stacking apparatus of claim [4] *1* further including a main carriage frame structure with a carriage movably mounted therein and actuated back and forth by hydraulic cylinder means operatively connected between said main carriage frame structure and said carriage, and wherein both said first and second pushers are operatively connected to and driven by said carriage.

21. The method of handling and stacking bricks of claim [20] *26* wherein prior to moving said elevator assembly to said second position the method includes separating the first row of brick received in said first receiving level of said elevator assembly from adjacent bricks of said brick supply in order that said elevator assembly may be moved to said second position without significant interference between the first row of bricks received in the first receiving in the first receiving level and adjacent bricks of the brick supply.

23. The method of claim [20] *26* as set forth therein wherein [a] *the* first row of bricks is transferred into a lower level of said elevator assembly while said elevator assembly is disposed in an upper position; moving said elevator assembly to a lower position; transferring [another] *said second* row of brick into an upper receiving level of said elevator while said elevator assembly is in said lower position; moving said elevator assembly back to an upper position; and simultaneously engaging the brick within said upper receiving level, and pushing [another] *a third* row of brick into the lower level of said elevator assembly causing the brick therein to be pushed therefrom as the brick row thereabove in said upper receiving level is pushed from the elevator assembly, such that the upper brick row falls onto the lower brick row as the two rows are simultaneously discharged from the elevator assembly.

Claims 6-9, 11-13, and 22, dependent on amended claims, are determined to be patentable.

New claim 26 is added and determined to be patentable.

26. *A method of handling and stacking bricks comprising the steps of aligning a first receiving level of an elevator assembly with a supply of bricks; advancing said supply of bricks towards said first receiving level of said elevator assembly to where a first row of bricks from said supply is transferred into said first receiving level; moving said elevator assembly to a second position with respect to the supply of bricks such that a second receiving level thereof aligns with said supply of bricks; advancing said supply of bricks towards said second receiving level of said elevator assembly to where a second row of bricks from said supply is transferred into said second receiving level of said elevator assembly; and simultaneously pushing both first and second rows of bricks from their respective receiving levels of said elevator assembly onto an adjacent receiving table by advancing said supply of bricks towards a selected receiving level of said elevator assembly and effectively transferring the row of bricks therefrom by transferring a third row of bricks from said supply into the selected receiving level while simultaneously engaging the other row of bricks in the other receiving level of said elevator assembly and pushing them therefrom such that the two rows of bricks are simultaneously pushed from the respective receiving levels of said elevator assembly in such a manner that an uppermost disposed row falls onto a lowermost row to form a stack of bricks at least two courses high on said receiving table.*

\* \* \* \* \*